(12) United States Patent
Yamazaki

(10) Patent No.: US 7,672,008 B2
(45) Date of Patent: Mar. 2, 2010

(54) IMAGE PROCESSING DEVICE, METHOD AND PROGRAM PRODUCT FOR SEPARATING CHARACTER, HALFTONE GRAPHIC, AND HALFTONE PHOTOGRAPHIC REGIONS

(75) Inventor: Tsutomu Yamazaki, Kanagawa-Ken (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1030 days.

(21) Appl. No.: 09/858,628

(22) Filed: May 17, 2001

(65) Prior Publication Data

US 2001/0050785 A1    Dec. 13, 2001

(30) Foreign Application Priority Data

May 17, 2000    (JP)    ............................. 2000-145513

(51) Int. Cl.
*G06K 15/02*    (2006.01)
*H04N 1/387*    (2006.01)
*H04N 1/40*    (2006.01)
*H04N 1/46*    (2006.01)

(52) U.S. Cl. ...................... 358/1.18; 358/1.11; 358/450; 358/462; 358/540

(58) Field of Classification Search .................. 358/1.9, 358/462, 1.11, 1.18, 450, 540; 382/168, 382/171, 176, 239
See application file for complete search history.

(56) References Cited

U.S. PATENT DOCUMENTS

| | | | | |
|---|---|---|---|---|
| 4,920,426 A | * | 4/1990 | Hatori et al. | ................. 382/239 |
| 5,134,666 A | * | 7/1992 | Imao et al. | .................. 382/164 |
| 5,570,432 A | * | 10/1996 | Kojima | ....................... 382/254 |
| 5,742,704 A | * | 4/1998 | Suzuki et al. | ............... 382/176 |
| 5,872,863 A | * | 2/1999 | Tsuboi et al. | ............... 382/151 |
| 5,949,555 A | * | 9/1999 | Sakai et al. | .................. 358/462 |
| 5,982,926 A | * | 11/1999 | Kuo et al. | ................... 382/167 |
| 6,005,680 A | * | 12/1999 | Luther et al. | ................ 358/2.1 |
| 6,735,341 B1 | | 5/2004 | Horie et al. | |

FOREIGN PATENT DOCUMENTS

| | | |
|---|---|---|
| JP | 08-223409 | 8/1996 |
| JP | 08-251402 | 9/1996 |
| JP | 08-251410 | 9/1996 |
| JP | 08-307722 | 11/1996 |
| JP | 2000-013613 | 1/2000 |
| JP | 2000-132678 | 5/2000 |

OTHER PUBLICATIONS

Notification of Reasons for Refusal issued in corresponding Japanese Patent Application No. 2000-145513, mailed Jun. 10, 2008, and translation thereof.
Notification of Reason for Refusal in JP 2000-145513 dated Feb. 10, 2009, and an English Translation thereof.

* cited by examiner

*Primary Examiner*—James A Thompson
(74) *Attorney, Agent, or Firm*—Buchanan Ingersoll & Rooney PC

(57) ABSTRACT

An image processing device including a detector for detecting a characteristic feature formed from image data and a separator for separating halftone dot graphic regions and halftone dot photographic regions from the image data based on the characteristic feature.

37 Claims, 17 Drawing Sheets

REMOVED FREQUENCY COMPONENTS

EXTRACTED FREQUENCY COMPONENT

EXTRACTED FREQUENCY COMPONENT

IMAGE PROCESSING DEVICE, METHOD AND PROGRAM PRODUCT FOR SEPARATING CHARACTER, HALFTONE GRAPHIC, AND HALFTONE PHOTOGRAPHIC REGIONS

This application is based on Japanese Patent Application No. 2000-145513 filed on May 17, 2000, the contents of which are hereby incorporated by reference.

BACKGROUND OF THE INVENTION

1. Field of the Invention

The present invention relates to image processing wherein image data are divided into multiple regions based on the feature extraction of image data.

2. Description of Related Art

Documents used in image processing devices include documents that consist of multiple images with various attributes such as character images, halftone dot images, and photographic images. It is, therefore, desirable to perform image processing most suited for the particular attribute of a particular image. It is necessary to perform regional recognition for dividing image data into regions by attributes, exactly.

The technique of dividing image data into halftone dot regions, photographic regions, character regions, and graphic regions has been known.

Halftone dot regions can be divided into halftone dot graphic regions, i.e., regions where graphics consist of halftone dots, and halftone dot photographic regions, i.e., regions where photographs consist of halftone dots. However, there has been no known technology for separating them.

For example, in an image processing system wherein images within halftone dot graphic regions are vector transformed and outputted by filling each closed region with a solid color, images in a halftone dot photographic region are also vector transformed as images in a halftone dot graphic region. Therefore, the gradation of the images in the halftone dot photographic region become deteriorated, and the images of the halftone dot photographic region become transformed into images like illustration.

SUMMARY OF THE INVENTION

It is therefore a general object of the present invention to provide an image processing technology for separating halftone dot graphic regions from halftone dot photographic regions.

More specifically, it is an object of the invention to provide an image processing device including a detector for detecting a characteristic feature formed from image data and a separator for separating halftone dot graphic regions and halftone dot photographic regions from the image data based on the characteristic feature.

Also an object of the invention is to provide a program product for causing a computer to execute the steps of detecting a characteristic feature formed from image data and separating halftone dot graphic regions and halftone dot photographic regions from the image data based on the characteristic feature.

A further object of the invention is to provide an image processing method comprising the steps of detecting a characteristic feature formed from image data and separating halftone dot graphic regions and halftone dot photographic regions from the image data based on the characteristic feature.

The objects, characteristics, and advantages of this invention other than those set forth above will become apparent from the following detailed description of the preferred embodiments, which refers to the annexed drawings.

DETAILED DESCRIPTION OF THE EMBODIMENTS

The embodiments of this invention will be described below with reference to the accompanying drawings.

Embodiment 1

Figure 1:
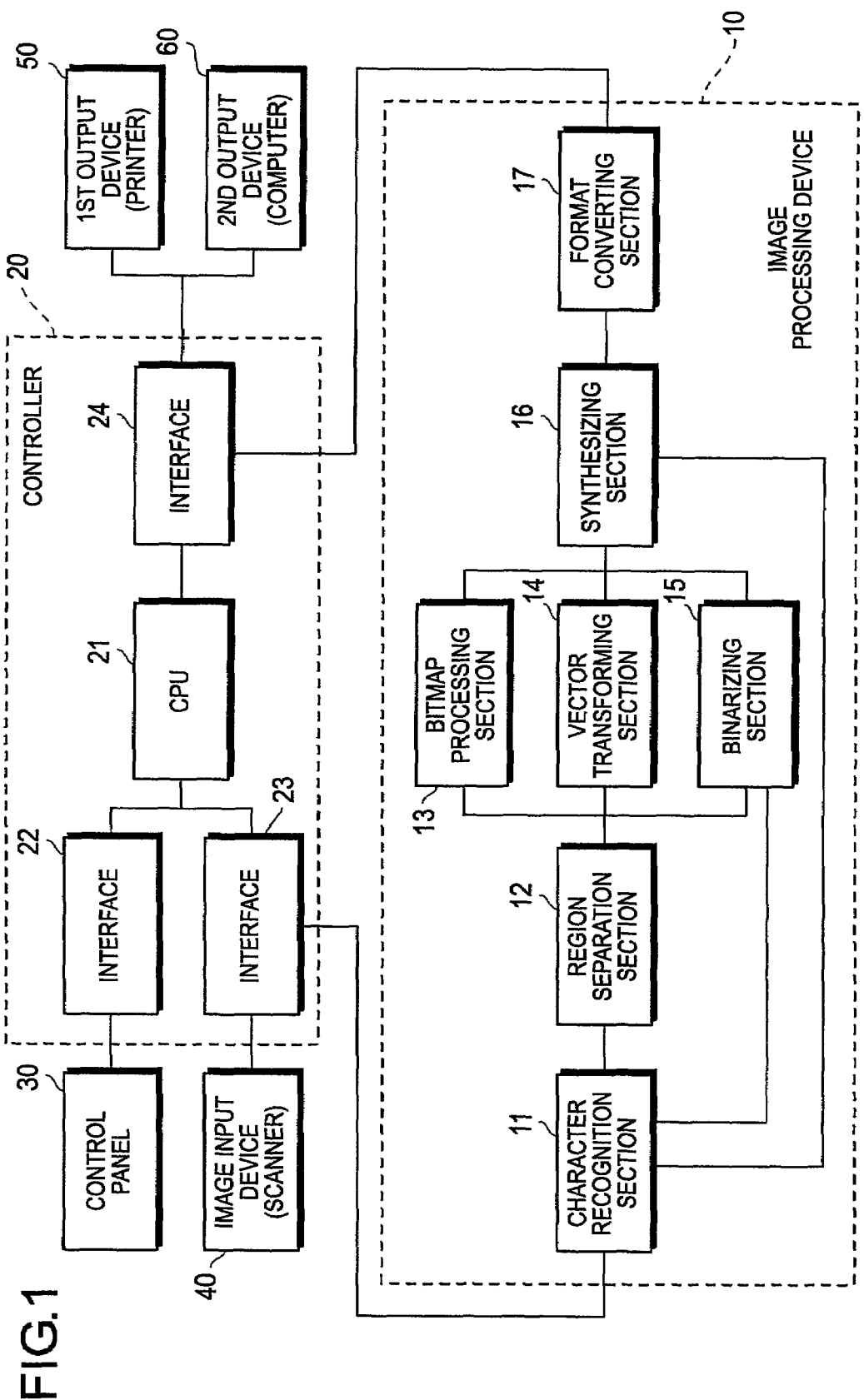
FIG. 1 is a block diagram of an image processing system according to the first embodiment of the invention.

The image processing system shown in FIG. 1 has an image processing device 10, a controller 20, a control panel 30, an image input device 40, a first output device 50, and a second output device 60.

The image processing device 10 has a character recognition section 11, a region separation section 12, a bitmap processing section 13, a vector transforming section 14, a binarizing section 15, a synthesizing section 16, and a format converting section 17.

The controller 20 has an interface 22 for the control panel 30, an interface 23 for the image input device 40, an interface 24 for the first output device 50 and the second output device 60, and a central processing unit (CPU) 21 that controls the interfaces 22 through 24.

The control panel 30 is used for entering the user's instructions. The image input device 40 is an image reading device such as a color scanner. The first output device 50 is an image forming device such a color printer, the second output device 60 is, e.g., a computer equipped with a monitor, and displays, stores, and conducts data-processing on image data being outputted.

Functions of each section will be described in detail below following the flow of operations.

The user inputs instruction information using the control panel 30. The instruction information is, for example, an instruction for starting an operation or for setting up a manual setup item.

The manual setup items include selection of output regions, selection of post processing, weighting setup for region separation, setup for scanning mode, and selection of output format.

The selection of the output region is a setup item for selecting a region that is to be applied in the synthesizing section 16 and specifies whether character regions, halftone dot graphic regions, or halftone dot photographic regions will be outputted respectively.

The selection of post processing is a setup item for selecting post processes to be applied to the regions separated by the character recognition section 11 and the region separation section 12, i.e., character regions, halftone dot graphic regions and halftone dot photographic regions. The post processing includes character coding at the character recognition section 11, bitmap processing at the bitmap processing section 13, vector transformation at the vector transforming section 14, and binarization at the binarizing section 15.

The weighting setup is used for adjusting the parameters of region separation in the region separation section 12 and can set up the threshold values of separation closer to characters, photographs or graphics.

The scanning mode setup is for selecting either the color mode that processes the document image as a color image or the monochromatic mode that processes the document image as a monochromatic image at the image input device 40.

The selection of the output format is a setup item for selecting the format of output files to be formed at the format converting section 17. The output formats include general purpose file formats such as the document file format, the page description language format, the filing format for document display, and the file format for preserving images.

For example, the document file format can be either the Rich Text Format, the page description language file format can be either the PostScript®, the file format for document display can be PDF (Portable Document Format), the file format for preserving images can be the JPEG (Joint Photographic Experts Group) or the TIFF (Tagged Image File Format).

The instruction information from the control panel 30 is transmitted to the controller 20 via the interface 22.

When it receives the instruction information for a manual setup item, the controller 20 inputs the manual setup into the image processing device 10. Furthermore, when it receives an operation start instruction, the controller 20 instructs the image input device 40 to start image scanning on the color mode or the monochromatic mode in accordance with the scanning mode setting.

The image input device 40 scans the document image based on the operation start instruction from the controller 20 to read the document image. The formed image data is transmitted to the character recognition section 11 of the image processing device 10 via the interface 23 of the controller 20.

The character recognition section 11 separates character regions from the image data and extracts character images existing in the character regions. The image data devoid of character images are inputted into the region separation section 12. Moreover, the character recognition section 11 transforms character images into character code data. The character code data thus obtained are inputted into the synthesizing section 16 together with position data and color information.

If binarization is specified as the post processing of the output region by the user, the character regions will be inputted into the binarization section 15. If the weighting setup is specified, the parameter for separating character regions from the image data will be changed according to the setup.

The region separation section 12 detects a characteristic feature of the luminosity image formed from the image data devoid of character images and separates halftone dot graphic regions and halftone dot photographic regions from the image data based on the characteristic feature. In other words, the region separation section 12 has the detector that detect the characteristic feature of the luminosity images formed from the image data and the separator that separates halftone dot graphic regions and halftone dot photographic regions from the image data based on the characteristic feature. No separation will be performed on images that do not require separation.

The data of the halftone dot photographic region separated by the region separation section 12 will be added with position data and will be inputted into the bitmap processing section 13, while the data of the halftone dot graphic region will be added with position data and will be inputted into the vector transforming section 14.

In case when the weighting setup is specified, the parameter for separating halftone dot photographic regions and halftone dot graphic regions from the image data are adjusted and the boundary for separating the regions are changed. When the post processing is specified for each region, the image data after separating the regions will be inputted into the bitmap processing section 13 or the vector transforming section 14 or the binarizing section 15 in accordance with the specified contents.

The bitmap processing section 13 is intended for processing images to which the bitmap processing is specified as the post process and applies edge corrections and smoothing processes to the halftone dot photographic regions. After that, the data of the halftone dot photographic region will be inputted into the synthesizing section 16.

The vector transforming section 14 applies vector transformation to the data of the halftone dot graphic regions to generate vector data. The vector data thus obtained will be inputted into the synthesizing section 16 together with attribute data. The vector transformation means transformation of graphics consisting of halftone dots into vector data of straight lines, arcs, Bezier curves, etc.

The attribute data are, for example, the data obtained by extracting the features of the color, line width, line type, line color, ending shape of the closed region enclosed by the vector data. The vector transforming section 14 applies the above processes to the image data, to which the vector transformation is specified as the post processing.

The binarizing section 15 binarizes the image data inputted from the character recognition section 11 and/or the region separation section 12 in case when the binarization is specified as the post processing. The binarization data is inputted into the synthesizing section 16 together with position data.

The synthesizing section 16 synthesizes the data from the character recognition section 11, the bitmap processing section 13, the vector transforming section 14, and the binarizing section 15. The synthesized data thus obtained are transformed into internal format data and will be inputted into the format converting section 17. If there is any region to which an output is specified due to the output region selection, only the data of the image region, to which the output is specified, are synthesized.

The format converting section 17 transforms the internal format data into the specified external format data. The external format data will be inputted into the first output device 50 and/or the second output device 60. For example, the first output device 50 prints the data on paper and the second output device 60 stores the data and also displays the data on the monitor.

Figure 2:
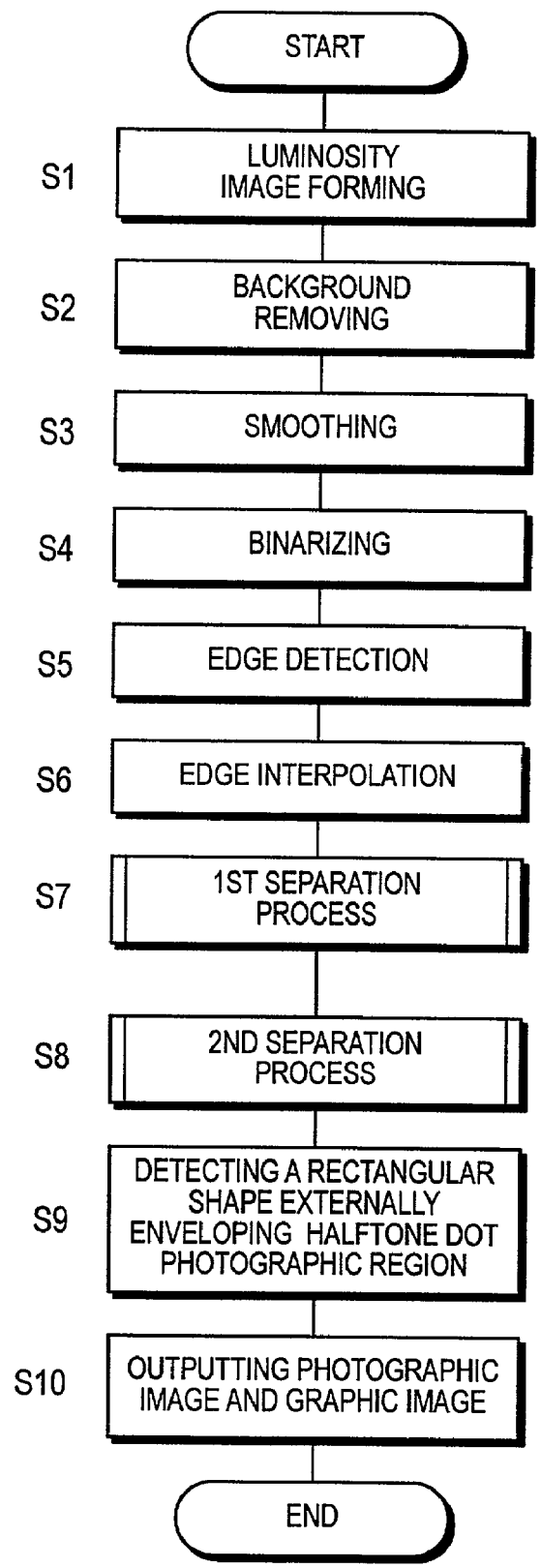
FIG. 2 is a flowchart of a region separation executed by a region separation section of an image processing device of the image processing system.

Next, the method of separating photographic regions and graphic regions at the region separation section 12 will be described in detail referring to the flow chart shown in FIG. 2.

Figure 3:
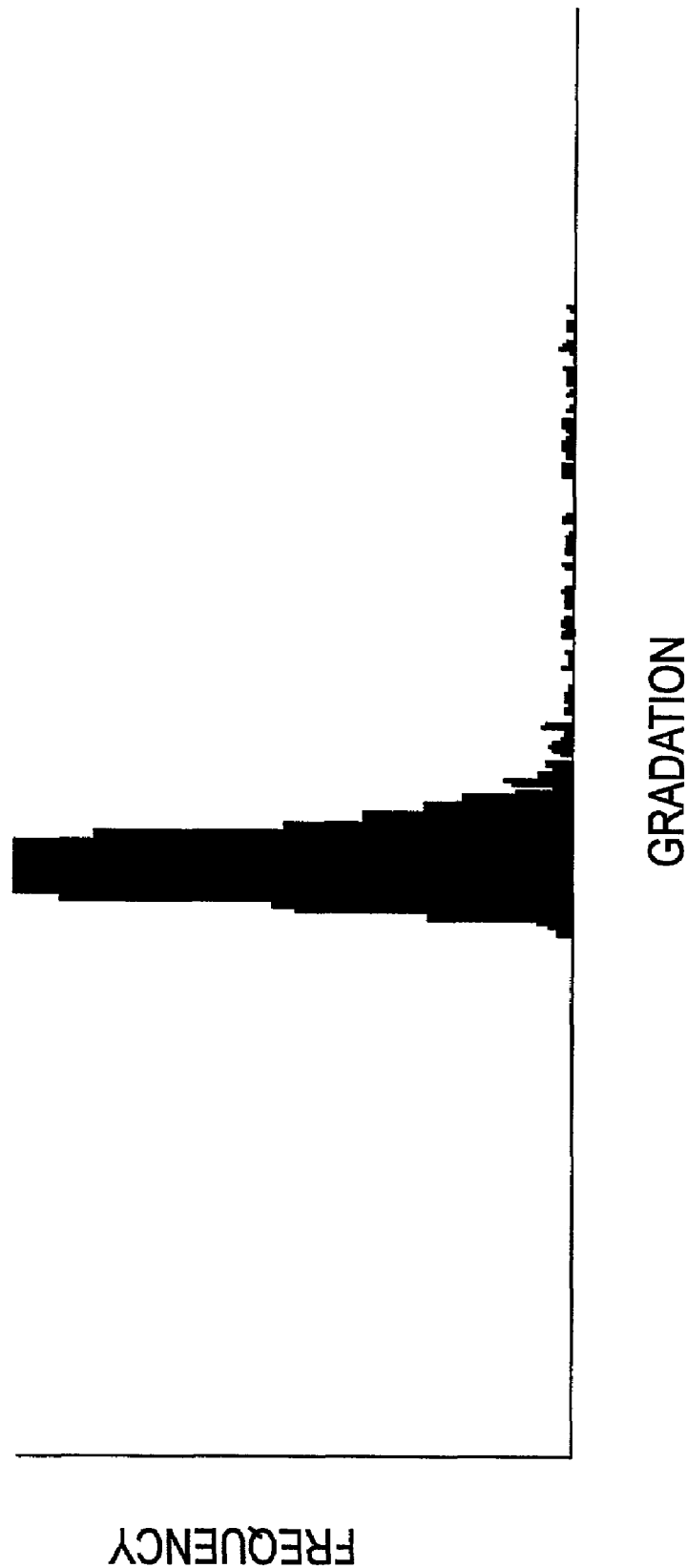
FIG. 3 is an example of histogram of luminosity distribution in graphic regions.
Figure 4:
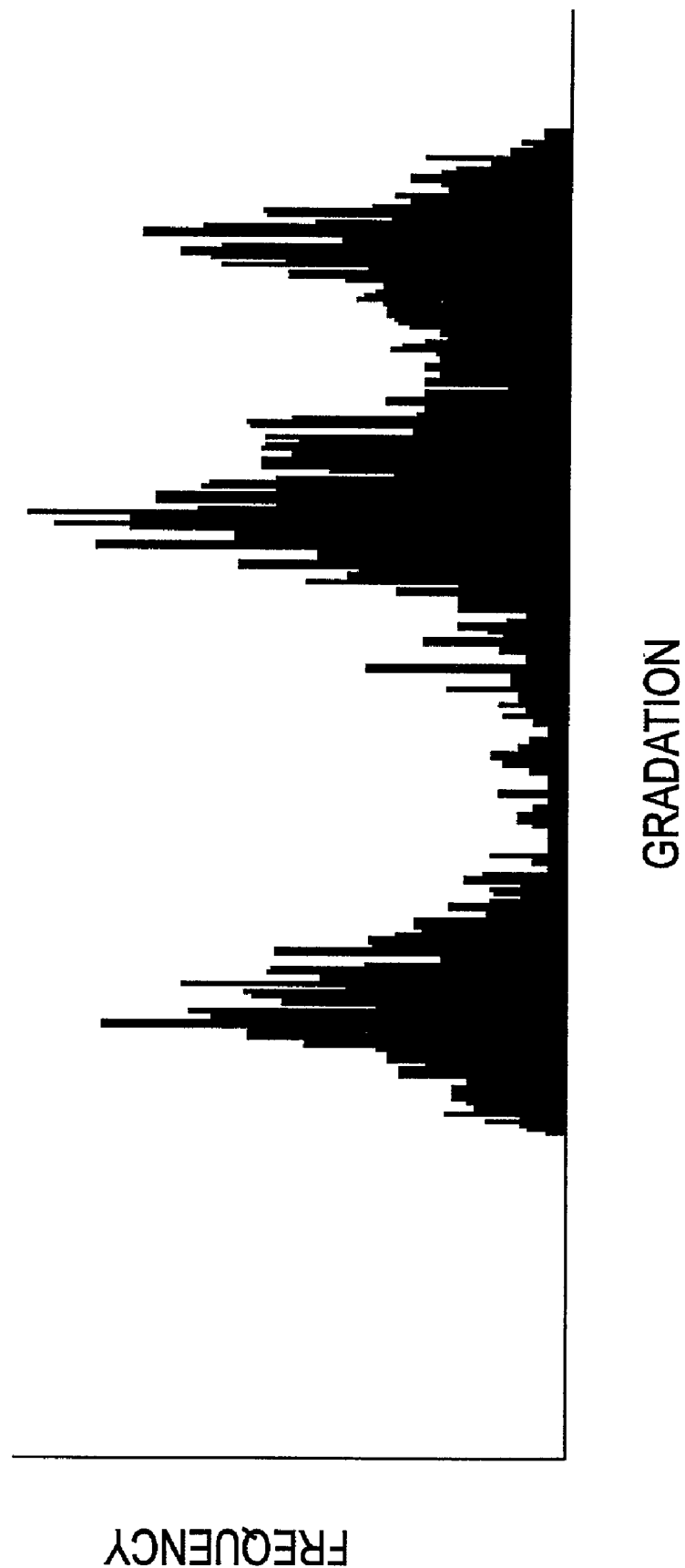
FIG. 4 is an example of histogram of luminosity distribution in photographic regions.

The luminosity distribution of a graphic region exists within a limited range and the peaks exist only in a concentrated area (see FIG. 3). On the other hand, the luminosity distribution of a photographic region exists in a relatively wide range, with the peaks existing in several locations (see FIG. 4). Therefore, photographic regions and graphic regions can be separated by producing a luminosity histogram covering a wide range and extracting the feature of the histogram.

Figure 5:
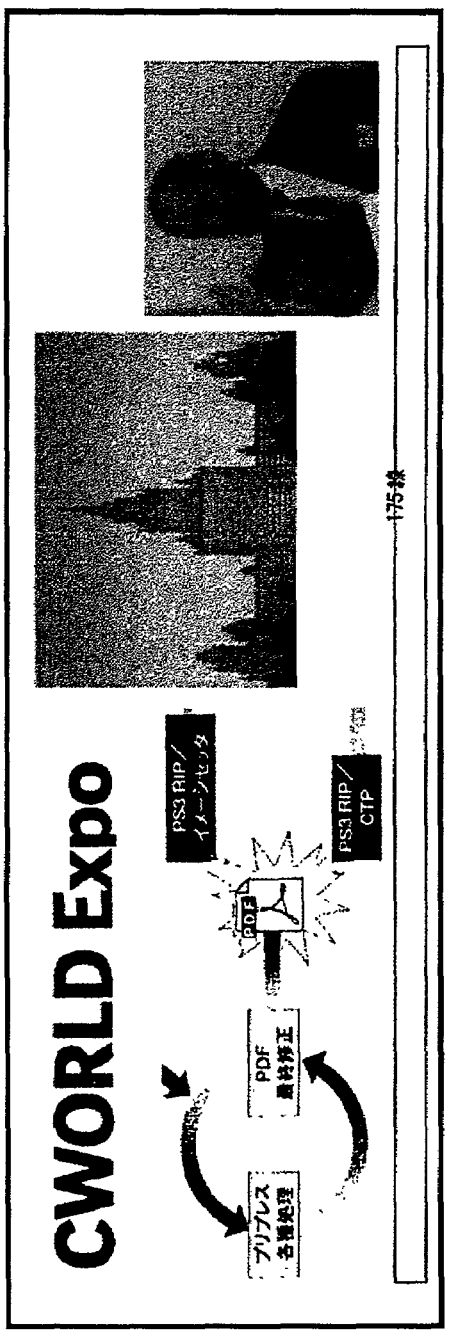
FIG. 5 is an example of luminosity images formed from input image data for the region separation section.

More specifically, an image consisting of luminosity, i.e., luminosity image, as shown in FIG. 5 is formed based on the input image data obtained from the character recognition section 11 (step S1). The luminosity V of each pixel can be calculated based on, for example, the following formula (1). However, the symbols $k_1$, $k_2$, and $k_3$ in the formula are constants, and the input image is assumed to be 8 bit image data consisting of R (red), G (green) and B (blue).

$$V = k_1 \times R + k_2 \times G + k_3 \times B \quad (1)$$

In FIG. 5, the image on the left side is a halftone dot graphic, the image on the center is a halftone dot photograph, and the image on the right is a non-halftone dot photograph (normal photograph).

Figure 6:
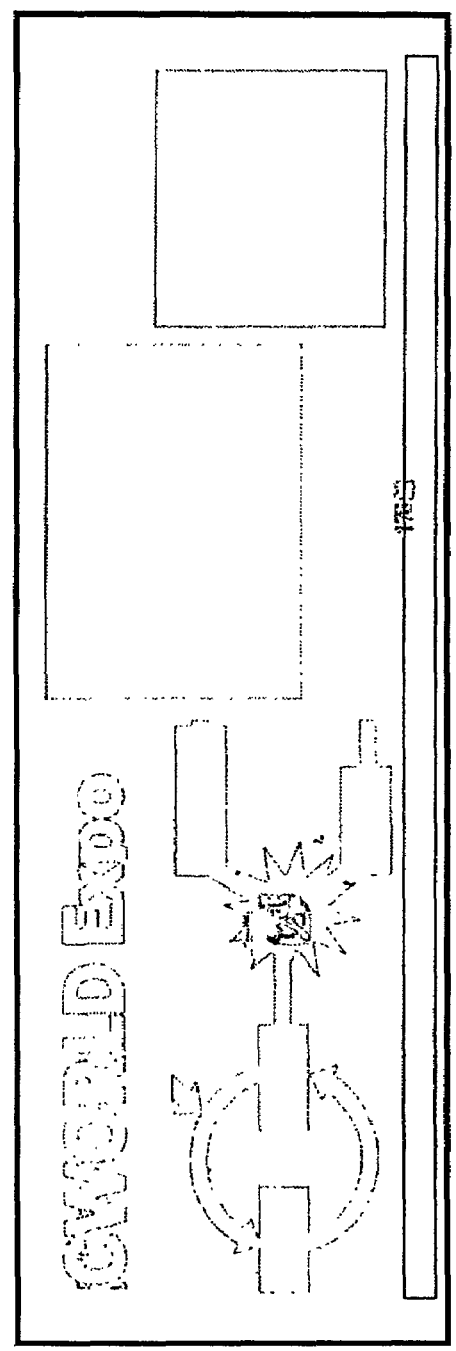
FIG. 6 is an image consisting of edges of the luminosity image shown in FIG. 5.

Next, the background will be removed from the luminosity image (step S2), and the smoothing process using the smoothing filter will be applied to the 3×3 pixel block (step S3). The luminosity image devoid of the background and noise is binarized (step S4), and the edge detection will be executed using a Laplacian filter, which is a differentiation filter of the second degree (step S5). By applying a closing (dilation and erosion) process, which is a kind of morphological operation, edges will be interpolated and an image consisting of edges, i.e., edge image, as shown in FIG. 6 will be obtained (step S6).

Next, the first separation process will be executed (step S7). The first separation process is generally conducted by calculating a characteristic feature based on a histogram formed by means of the edge image and the luminosity image, and executing region separation using the characteristic feature in relation to the first direction, e.g., the main scanning direction.

Next, the second separation process will be executed to generate the position data (step S8). The second separation process is generally conducted by executing the region separation in the second direction, which is perpendicular to the first direction, e.g., the secondary scanning direction.

Figure 7:
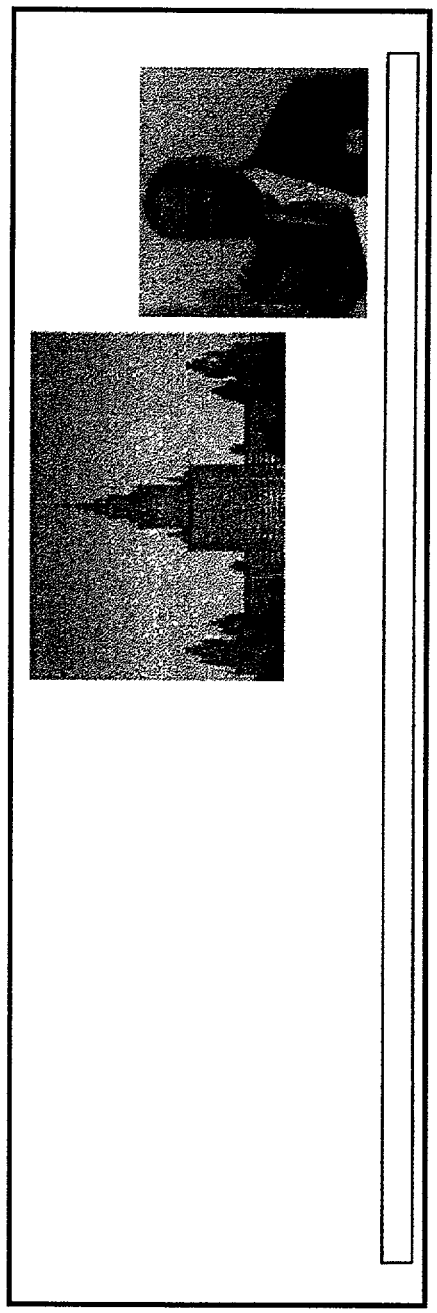
FIG. 7 is an example image consisting of a halftone dot photographic region and a normal photographic region separated from input image data.
Figure 8:
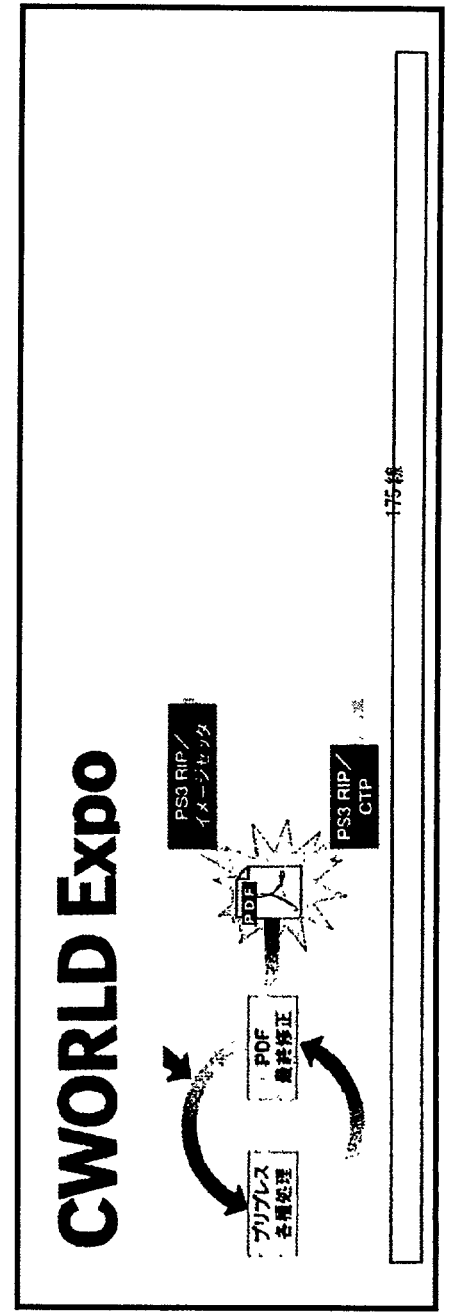
FIG. 8 is an example image of halftone dot graphic regions separated from input image data.

Tracing the outline of the halftone dot photographic region based on the position data detects a rectangular shape externally enveloping the halftone dot photographic region (step S9). Lastly, pixels corresponding to coordinate positions within the externally enveloping rectangular shape are separated from the input image data to output an image that consists of only the pixels belonging to the halftone dot and normal photographic regions as shown in FIG. 7 and an image that consists of only the pixels belonging to the halftone dot graphic region as shown in FIG. 8 (step S10).

Figure 9:
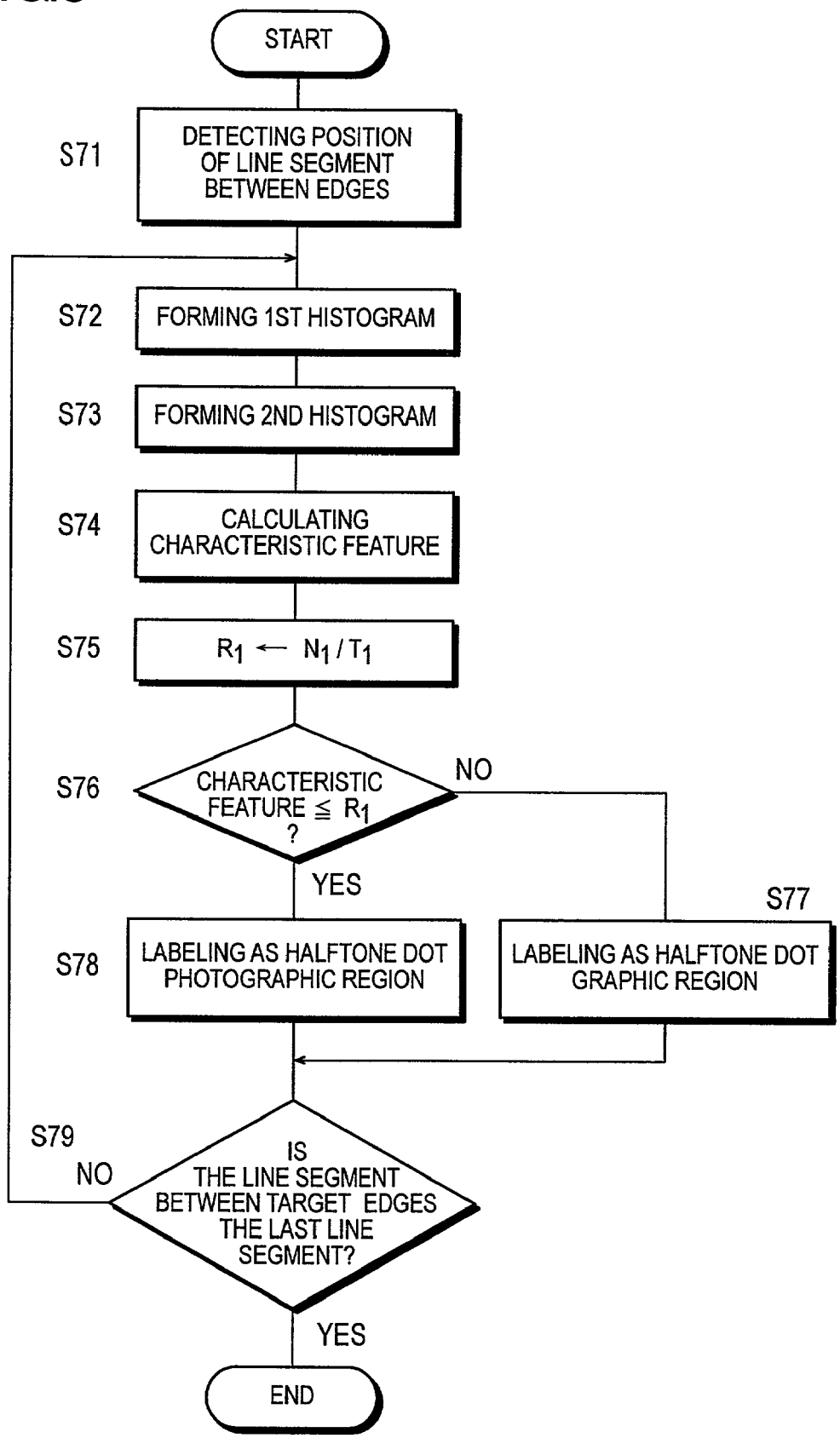
FIG. 9 is a flow chart of the first separation process in the region separation.

Next, the first separation process at the step S7 will be described in detail referring to the flow chart shown in FIG. 9.

Figure 10:
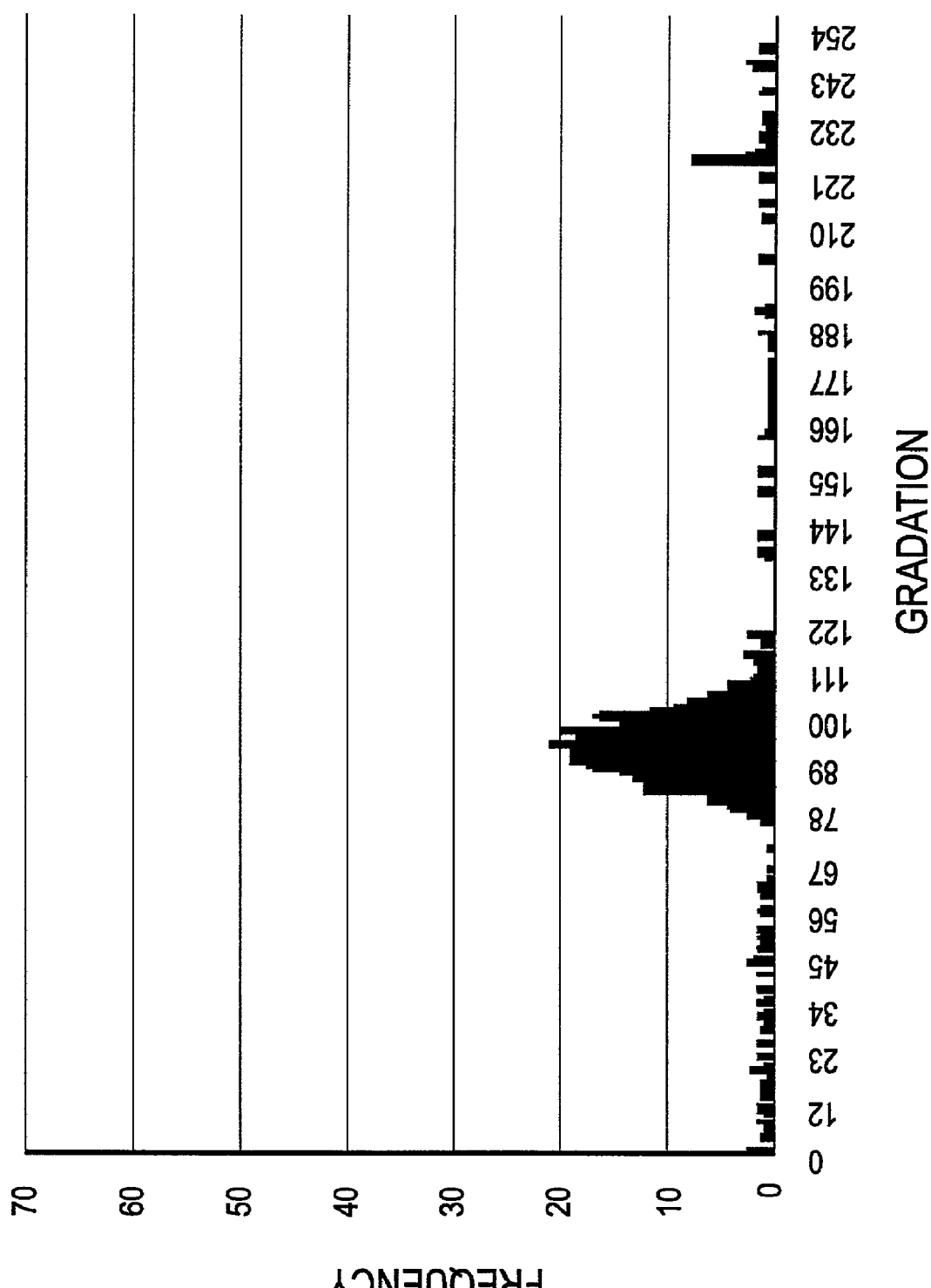
FIG. 10 is an example of the first histogram in the first separation process.
Figure 11:
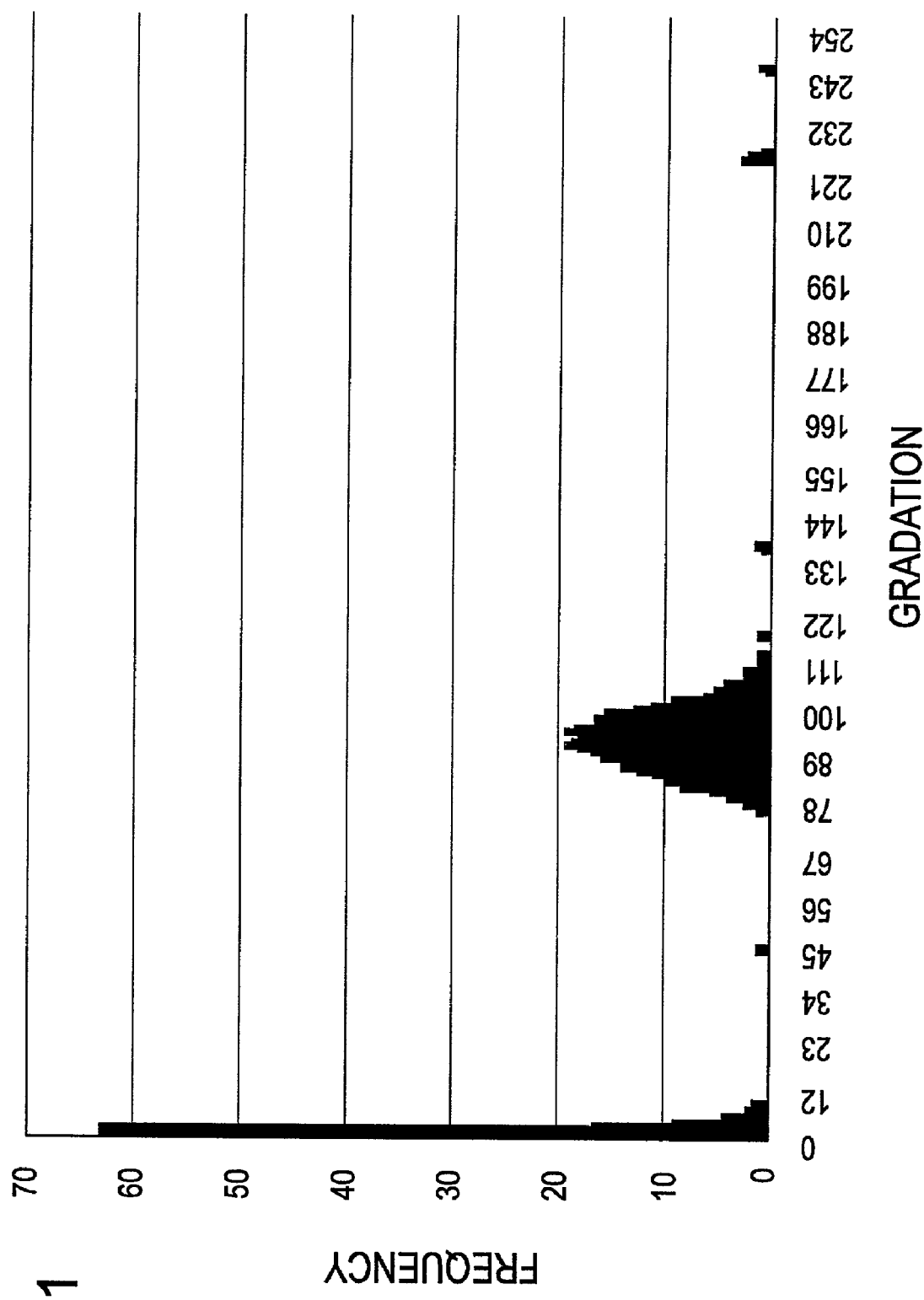
FIG. 11 is an example of the second histogram in the first separation process.

First, a position of a line segment between target edges concerning the first direction is detected based on the positions of the edges of the edge image (step S71). A histogram (first histogram) such as exemplified in FIG. 10 will be formed using the pixels of the luminosity image that corresponds to the position of the line segment between the target edges (step S72). By applying the smoothing process using the mean filter (|1|0|1|) to the first histogram, a second histogram such as the one shown in FIG. 11 will be formed (step S73).

Next, according to the formula (2), the difference between the first histogram Hist 1 and the second histogram Hist 2 is calculated for each gradation and the total is assumed as the characteristic feature (step S74). The luminosity is an 8 bit data and has 256 gradations.

$$\text{Characteristic feature} = \sum_{i=0}^{255} |Hist\ 1[i] - Hist\ 2[i]| \quad (2)$$

Next, the ratio between the total number $N_1$ of pixels existing on the line segment between the target edges and a predetermined constant $T_1$, i.e., $R_1$ ($=N_1/T_1$) is calculated (step S75). The constant $T_1$ is the first parameter for separating the halftone dot photographic region and the halftone dot graphic region, and its changed according to the weighting setup if it is set up.

Next, the ratio $R_1$, which is the threshold value, is compared with the characteristic feature (step S76). If the characteristic feature is judged to be greater than the ratio $R_1$, all the pixels located on the line segment between the edges are considered to belong in the halftone dot graphic regions and a process of assigning numbers, i.e., labeling, will be executed to generate labeling data (step S77). On the other hand, if the characteristic feature is judged to be smaller than or equal to the ratio $R_1$, all the pixels located on the line segment between the edges are considered to belong in the halftone dot photographic regions and labeling data will be formed (step S78).

A judgment will then be made whether the line segment between the target edges is the line segment between the last edges concerning the first direction (step S78). If the line segment between the target edges is judged not to be the line segment between the last edges, the process returns to the step S72, and the process will be repeated. On the other hand, if the line segment between the target edges is judged to be the line segment between the last edges, the process will terminate.

Figure 12:
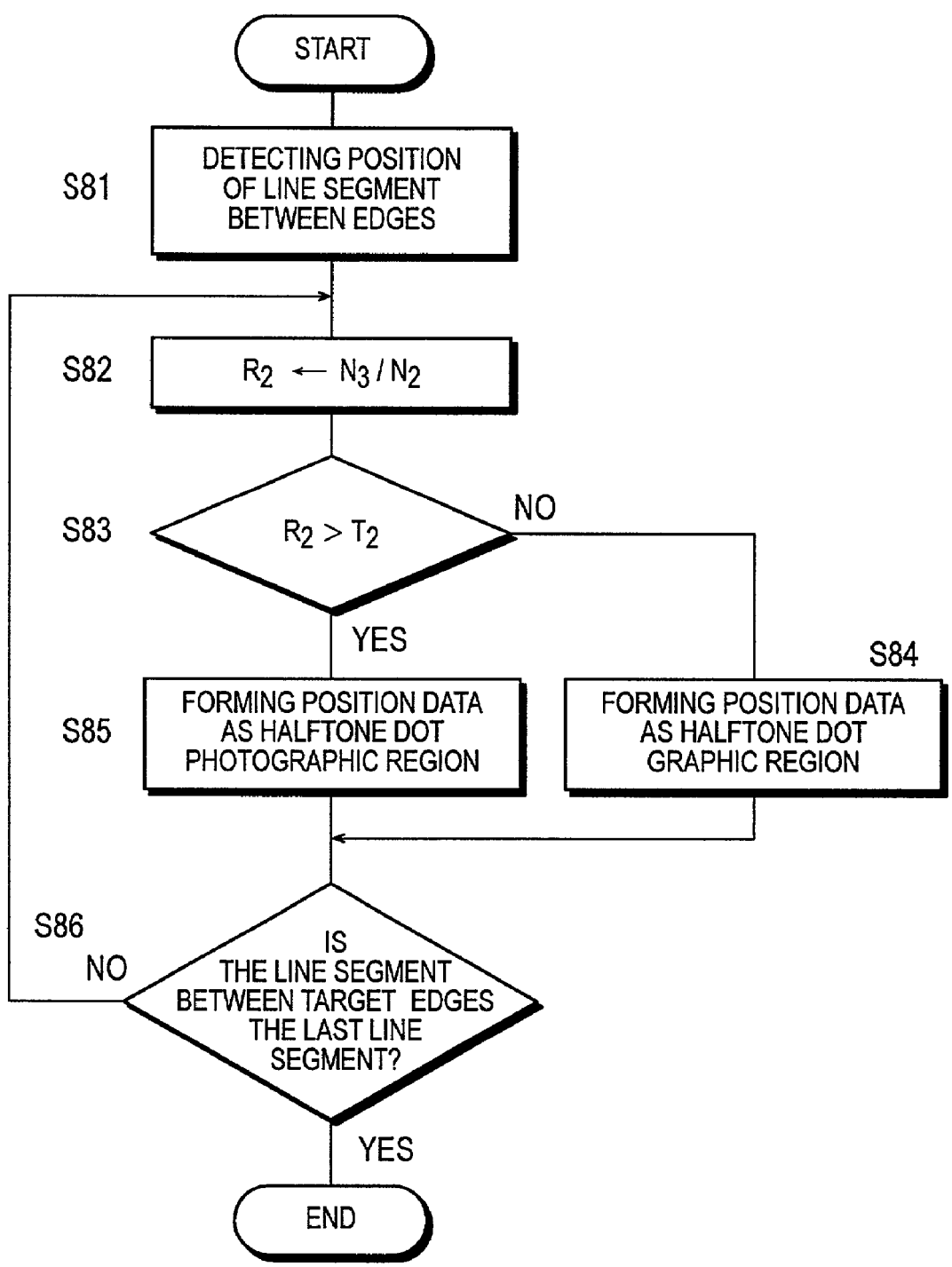
FIG. 12 is a flow chart of the second separation process in the region separation.

Next, the second separation process will be described in detail at the step S8 referring to the flow chart shown in FIG. 12.

A line segment between target edges concerning the second direction is detected based on the edge image (step S81). Based on the labeling data formed in the first separation process, the ratio between the total number $N_2$ of pixels existing on the line segment between the target edges and the total number $N_3$ of pixels belonging to the halftone dot photographic region, i.e., $R_2$ (=$N_3/N_2$) is calculated (step S82). Then, the ratio $R_2$ and the threshold value, i.e., a predetermined constant $T_2$ are compared (step S83). The constant $T_2$ is the second parameter for separating the halftone dot photographic region and the halftone dot graphic region, and is changed according to the setup when the weighting is set up.

If the ratio $R_2$ is equal to or smaller than the constant $T_2$, all the pixels located on the line segment between the target edges are considered to belong in the halftone dot graphic regions and their position data will be formed (step S84). On the other hand, if the ratio $R_2$ is greater than the constant $T_2$, all the pixels located on the line segment between the target edges are considered to belong in the halftone dot photographic regions and their position data will be formed (step S85).

Next, a judgment is made whether the line segment between the target edges is the line segment between the last edges concerning the second direction (step S86). If the line segment between the target edges is judged not to be the line segment between the last edges, the process returns to the step S82, and the process will be repeated. On the other hand, if the line segment between the target edges is judged to be the line segment between the last edges, the process will terminate.

As shown in the above, the halftone dot photographic regions and the halftone dot graphic regions can be separated from the image data based on the characteristic feature of the luminosity image formed from the image data in the first embodiment. Therefore, it is possible to apply image processing to the halftone dot photographic regions and the halftone dot graphic regions suited for each attribute.

For example, it is possible to apply vector-transformation to a graphic image in a halftone dot graphic region to fill the inside of a closed region with a solid color, while applying image processing such as a smoothing process to a halftone dot photographic region. In other words, it is possible to prevent edge clouding and Moiré pattern generations in graphic images in halftone dot graphic regions as well as edge misidentifications in halftone dot photographic regions. Moreover, since only the graphic images in the halftone dot graphic images can be vector-transformed, it is possible to reduce the size of an image file. Thus, image data can be transmitted faster.

Furthermore, halftone dot photographic regions and halftone dot graphic regions can be automatically separated and extracted from document image data. Therefore, when a user wants only halftone dot photographic regions or halftone dot graphic regions, the user does not have to specify the corresponding region manually.

Embodiment 2

In the region separation method according to the second embodiment, the characteristic feature of a luminosity image formed from image data is based on the frequency components extracted from the luminosity image. The second embodiment differs from the first embodiment in this regard as the latter uses histograms formed from luminosity images.

Figure 13:
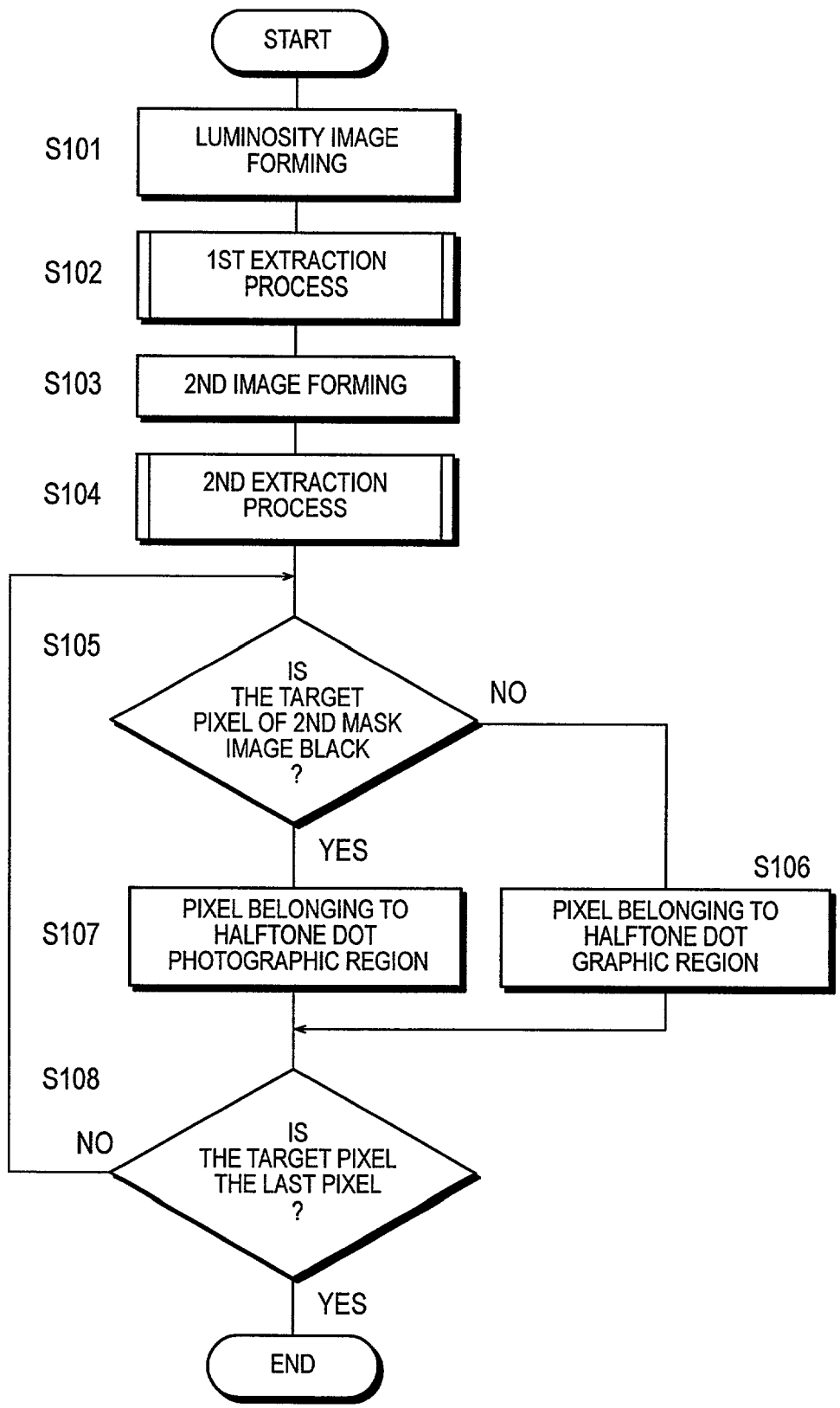
FIG. 13 is a flow chart of region separation according to the second embodiment of the invention.

Next, let us describe the region separation method referring to the flow chart shown in FIG. 13.

Figure 14:
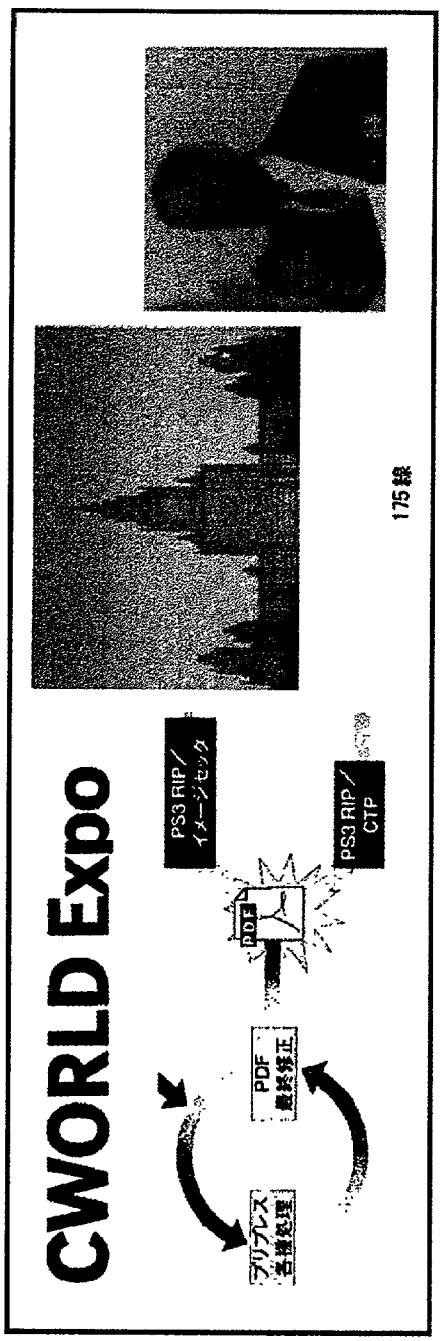
FIG. 14 is an example luminosity image formed from input image data.
Figure 15:
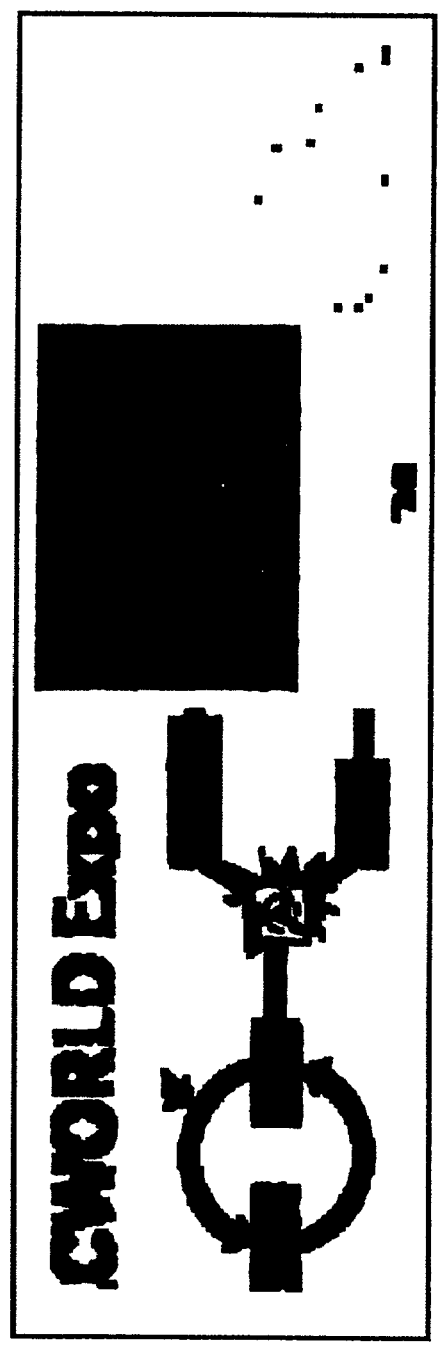
FIG. 15 is an example first mask image prepared from a luminosity image in the first extraction process.

A luminosity image such as shown in FIG. 14 is formed from the input image data (step S101). Next, the first extraction process in which the discrete cosine transformation (DCT) will be applied to the luminosity image is executed (step S102). The first extraction process produces the first mask image deprived of photographic regions as shown in FIG. 15.

Figure 16:
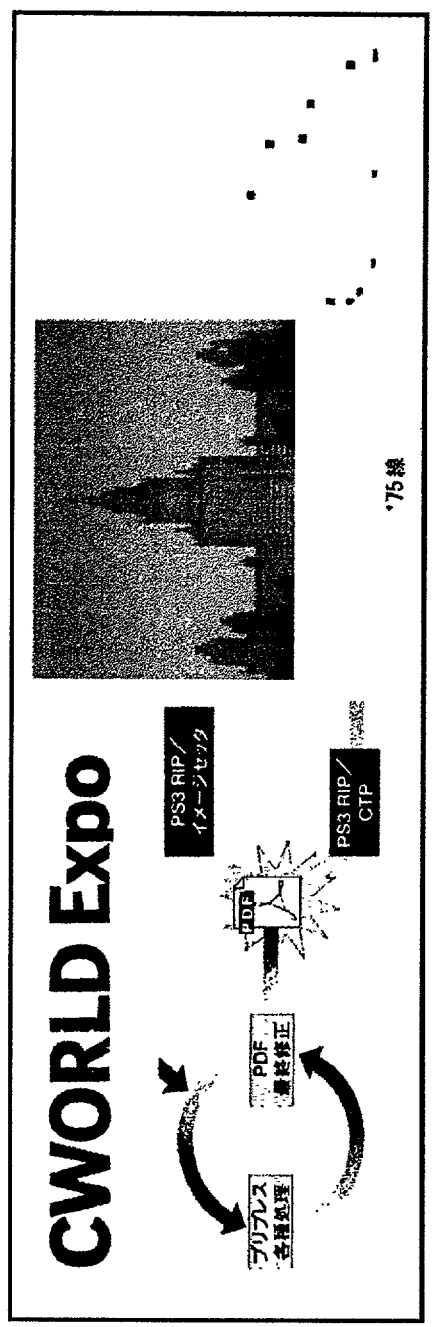
FIG. 16 is an example second image formed by removing photographic regions with a first mask image.
Figure 17:
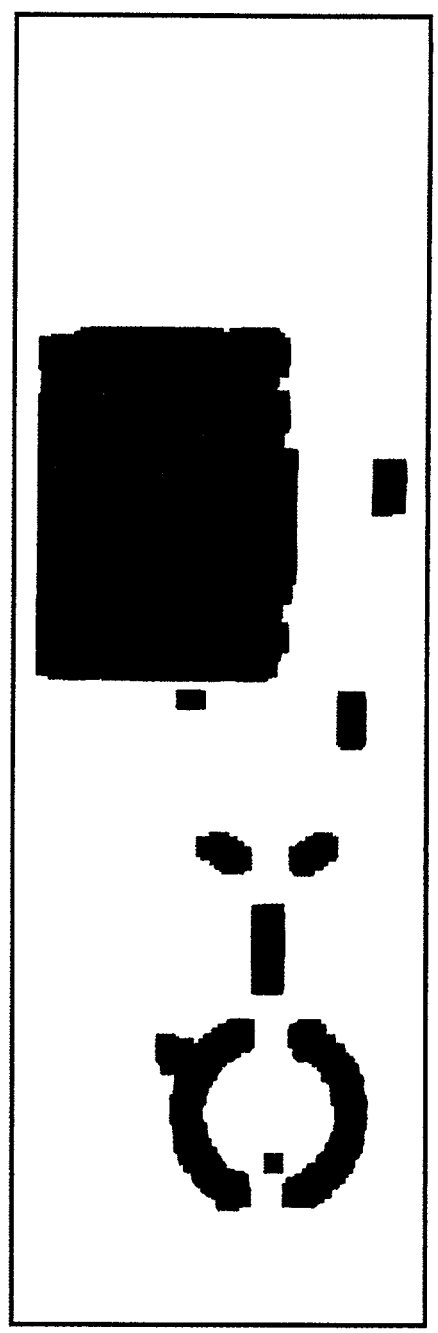
FIG. 17 is an example second mask image formed from a second image in the second extraction process.

Next, the mask process using the first mask image is applied to the luminosity image shown in FIG. 14 to obtain the second image shown in FIG. 16, which is deprived of photographic regions (step S103). Then, the second extraction process will be executed wherein the discrete cosine transformation (DCT) will be applied to the second image (step S104). In the second extraction process, the second mask image such as shown in FIG. 17 will be formed.

Next, a judgment is made as to whether each pixel of the second mask image belongs to a halftone dot photographic region or a halftone dot graphic region. First of all, a judgment is made whether the target pixel of the second mask image is black or white (step S105). If the target pixel is judged to be white, the pixel of the input image data corresponding to the coordinate position of the target pixel will be outputted as a pixel belonging to a halftone dot graphic region (step S106). On the other hand, if the target pixel is judged to be black, the pixel of the input image data corresponding to the coordinate position of the target pixel will be outputted as a pixel belonging to a halftone dot photographic region (step S107).

Figure 18:
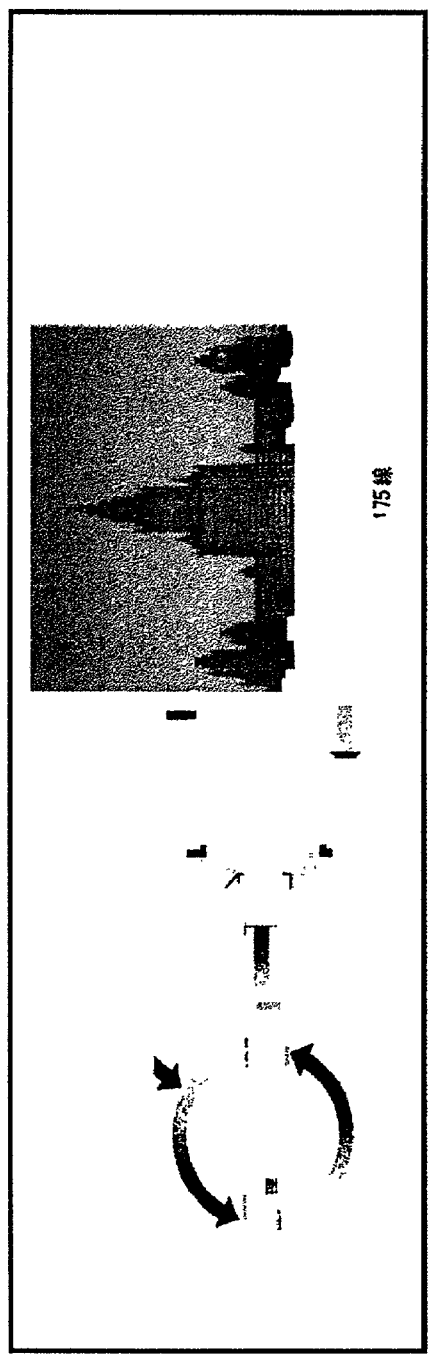
FIG. 18 is an example image of a halftone dot photographic region separated from input image data.
Figure 19:
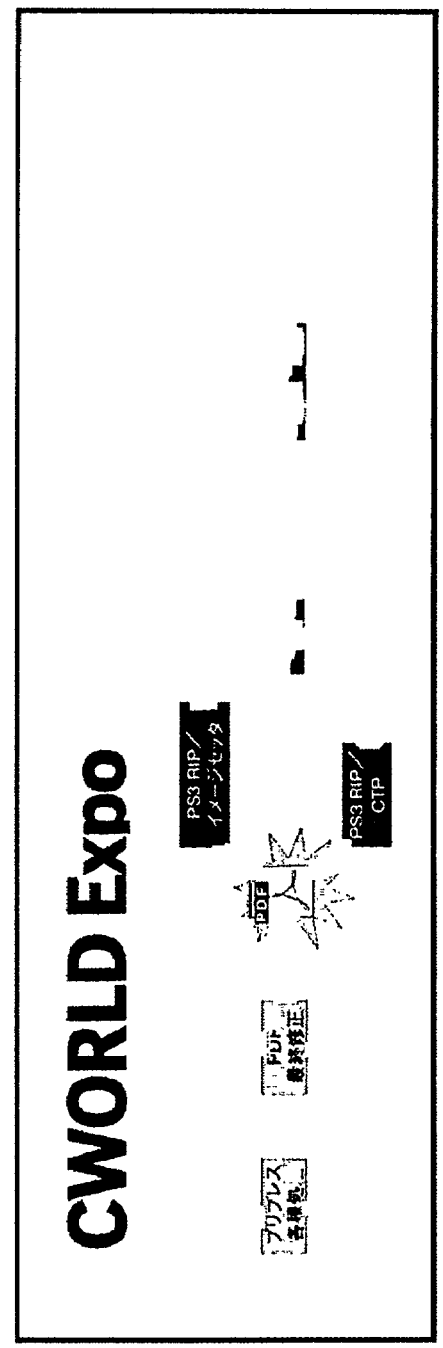
FIG. 19 is an example image of a halftone dot graphic region separated from input image data.

A judgment will then be made whether the process has been completed to all the pixels of the second mask image, in other words, whether the target pixel is the last pixel (step S108). If it is judged that the process has not been completed yet, the process returns to the step S105, and the process will be repeated. On the other hand, if it is judged that the process has been completed to all the pixels of the second mask image, the process will terminate. Consequently, the halftone dot graphic regions and the halftone dot photographic regions are separated and the halftone dot photographic image as shown in FIG. 18 and the halftone dot graphic image as shown in FIG. 19 will be obtained.

Figure 20:
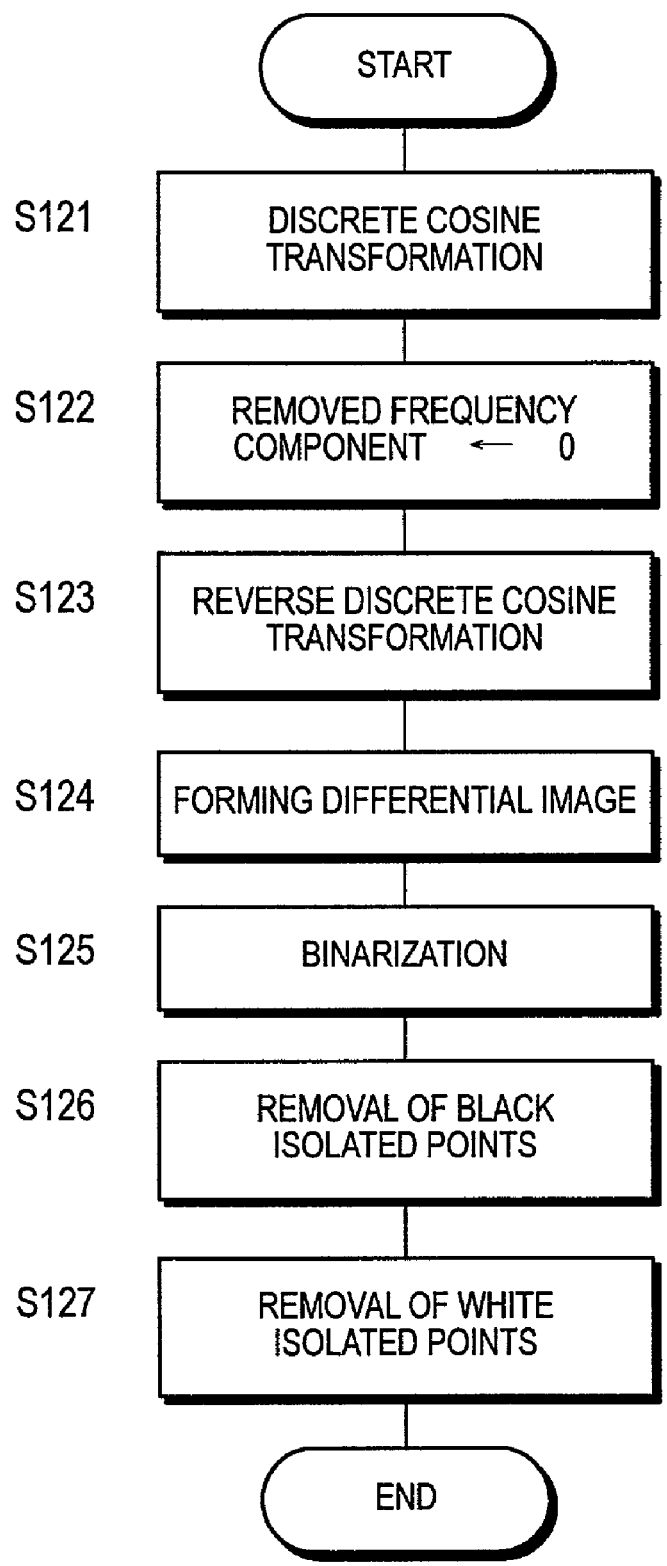
FIG. 20 is a flow chart of the first extraction process.
Figure 21:
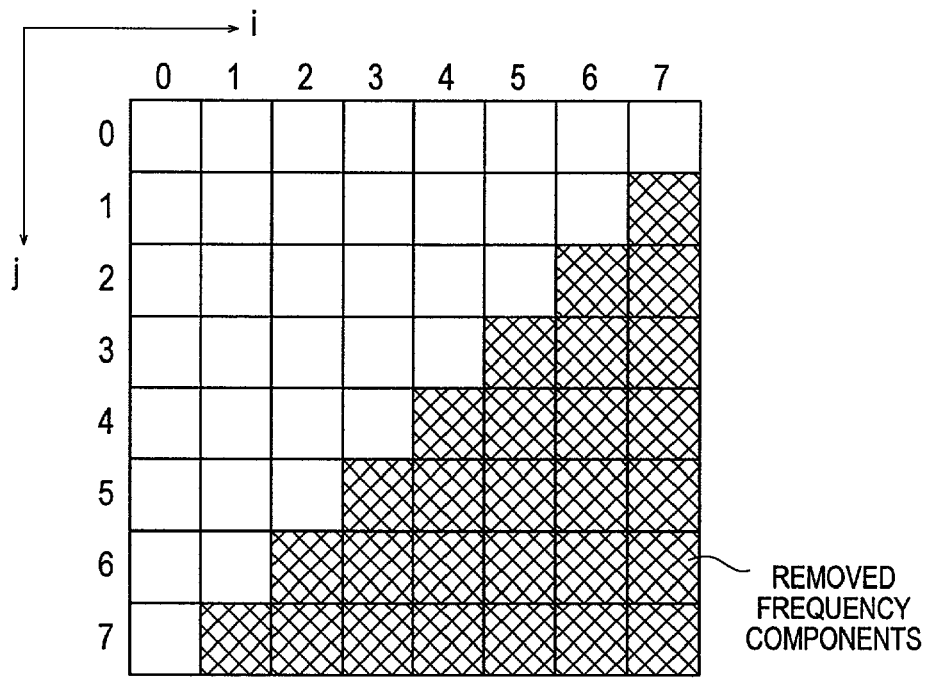
FIG. 21 is an example of deleted frequency components in the first extraction process.

Next, referring to the flow chart shown in FIG. 20, the first extraction process at the step S102 and the second extraction process at the step S104 will be described in detail.

First, in the first extraction process, the luminosity image shown in FIG. 14 will be divided into 8×8 pixel blocks and each block will be applied with the discrete cosine transformation to produce an 8×8 DCT coefficient matrix (step S121).

The DCT coefficient matrix can be calculated as C×pixel× $C_t$ by if the discrete cosine transformation matrix that can be expressed by the following formula (3) is C and the transpose of the matrix is $C_t$:

$$Cij = \begin{cases} \dfrac{1}{\sqrt{N}} & (i = 0) \\ \sqrt{\dfrac{2}{N}} \cos\left[\dfrac{(2j+1)i\pi}{2N}\right] & (i > 0) \end{cases} \quad (3)$$

Then, the value of the specified frequency component of the DCT coefficient matrix is set to "0" (step S122). The specified frequency component is the high frequency component specific to a photographic region. By setting the value of the high frequency component "0," an image deprived of photographic regions can be obtained.

Next, an operation reverse to the operation at the step S121, or a reverse discrete cosine transformation is executed to produce a compensation image deprived of high frequency components (step S123). Then, a differential image consisting of differential data between the luminosity image and the compensation image is formed (step S124) and the differential image will be binarized (step S125). Next, a maximum filter is applied to the differential image for each 5×5 pixel block to remove black isolated points (step S126). Consequently, the black regions of the differential image shrinks.

A minimum filter is applied to the differential image for each 15×15 pixel block to expand the black region thus to remove white isolated points that exist in the black regions (step S127). As a result, the first mask image as shown in FIG. 15, i.e., a differential image deprived of black isolated points and white isolated points as noises, can be obtained.

Next, the second extraction process will be described below.

Figure 22:
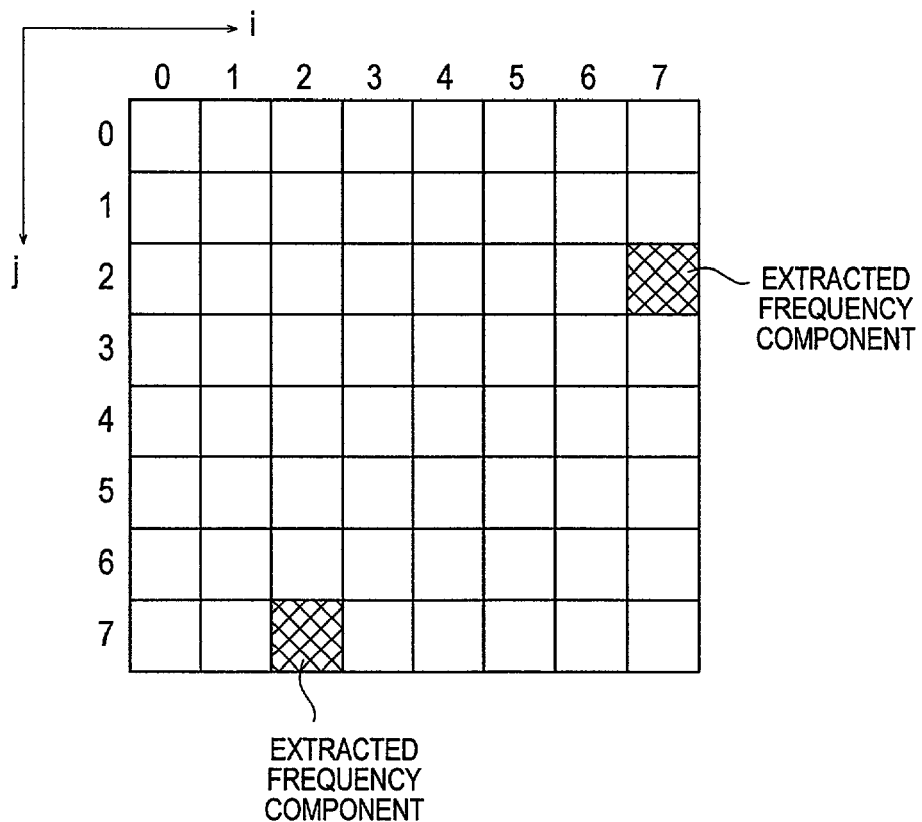
FIG. 22 is an example of extracted frequency components in the second extraction process.

First, the second image (see FIG. 16) obtained at the step S103 as an image deprived of photographic regions, is divided into 8×8 pixel blocks and is processed by discrete cosine transformation by each block to produce an 8×8 DCT coefficient matrix as shown in FIG. 22 (step S121). The extracted frequency components are the frequency components specific to halftone dot photographic regions.

Then, it sets up "0" as the values of frequency components other than the extracted frequency components (step S122) and executes a reverse discrete cosine transformation in order to extract frequency components specific to halftone dot photographic regions, thus to obtain a compensation image (step S123). Next, a differential image consisting of differential data between the second image and the compensation image is formed (step S124), and the differential image is binarized (step S125).

Next, black isolated points and white isolated points are removed (step S126 and S127). Consequently, the second mask image is formed as shown in FIG. 17.

In other words, the second extraction process is generally different in regard to the object of discrete cosine transformation and the extracted frequency components.

As can be seen from the above, halftone dot photographic regions and halftone dot graphic regions can be separated from the image data by means of using the frequency components extracted from the luminosity image as the characteristic feature in the second embodiment.

It is obvious that this invention is not limited to the particular embodiments shown and described above but may be variously changed and modified without departing from the technical concept of this invention.

For example, in addition to the histogram formed from the luminosity image and the frequency components extracted from the luminosity image, complexity of the profile, color distribution within a region, or the number of linear segments within a region can be used as the characteristic feature for regional separation.

The invention can be applied not only to systems consisting of multiple devices, but also to integrated equipment such as a digital copying machine and facsimile device.

Figure 23:
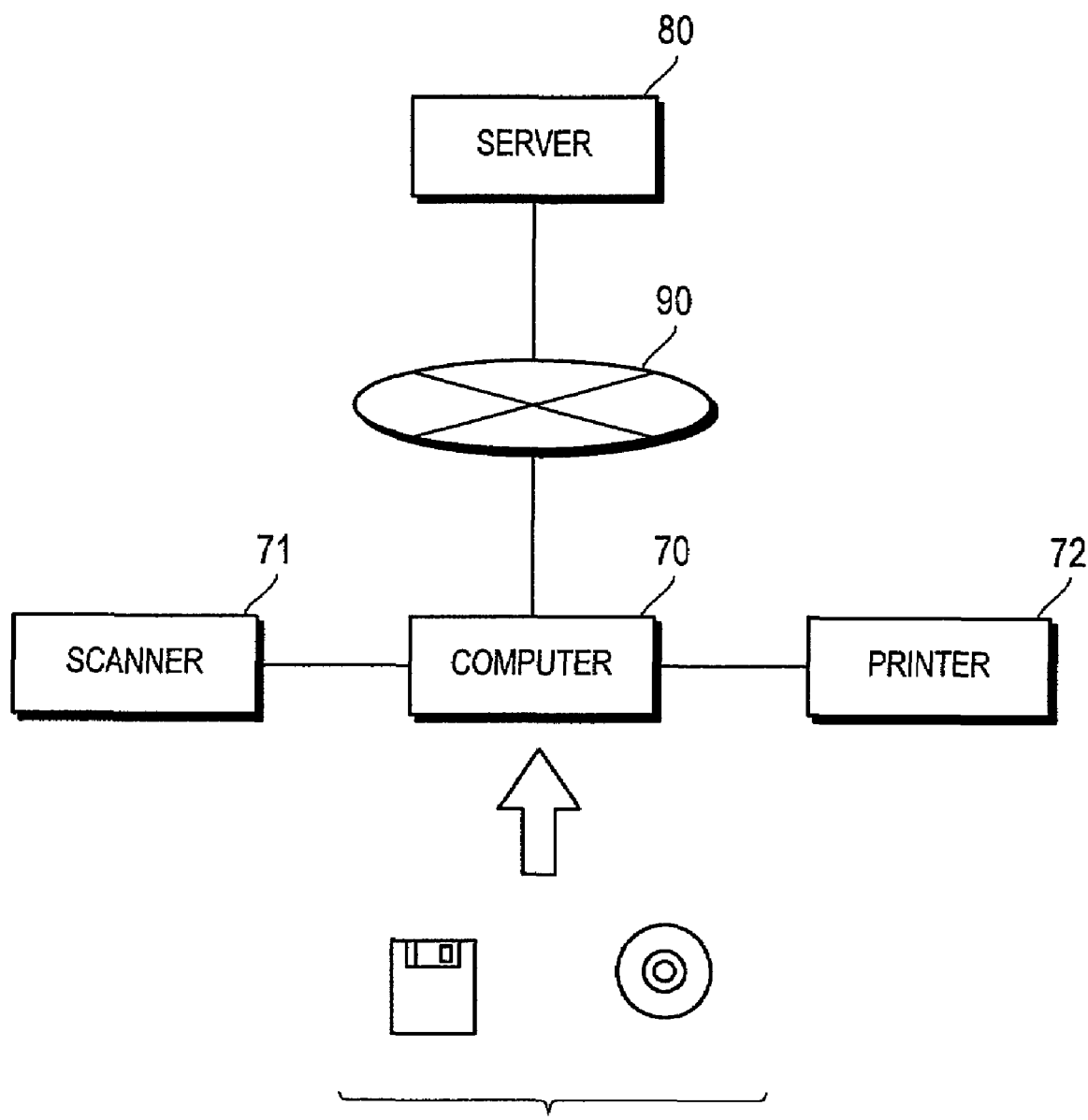
FIG. 23 is a conceptual diagram of a computer system according to the third embodiment of the present invention.

Furthermore, it is possible to make a computer to function as an image processing device by offering a program product which contains code data of programmed image processing method. A computer 70 shown in FIG. 23 that is connected with a scanner 71 and a printer 72 and can communicate with a server 80 via a network 90 is an example.

The program product includes a program itself and a storage medium 73 in which the program is contained. For example, the program is offered in the form of a storage medium such as a flexible disk or CD-ROM and executed being installed in the computer 70. The program can also be offered by means of downloading from the server 80 via a network 90 such as a LAN or the Internet, or executing directly.

What is claimed is:

1. An image processing device comprising:
   a character recognition section for extracting character regions from image data obtained by scanning an original image:
      wherein the image data includes one or more of the following three types of data:
      data representing regions that are not comprised of half-tone dots;
      data representing dots and spaces therebetween that form halftone dot graphic regions; and
      data representing dots and spaces therebetween that form halftone dot photographic regions;
   a detector for detecting a characteristic feature in luminance data of the image data from which data representing the character regions have been removed by the character recognition section, and which luminance image data includes the data representing dots and spaces therebetween that form halftone dot graphic regions and the data representing dots and spaces therebetween that form halftone dot photographic regions; and
   a distinguisher for distinguishing the data representing dots and spaces therebetween that form halftone dot graphic regions from the data representing dots and spaces therebetween that form halftone dot photographic regions based on the characteristic feature.

2. An image processing device as claimed in claim 1, in which said characteristic feature is based on a histogram formed from the luminance data.

3. An image processing device as claimed in claim 2, in which said characteristic feature is based on a difference between the histogram and a second histogram formed by applying a smoothing process to the histogram.

4. An image processing device as claimed in claim 2, in which said histogram is formed using pixels located on line segments between edges concerning a first direction based on locations of edges of the original image.

5. An image processing device as claimed in claim 1, in which said characteristic feature is based on frequency components extracted from the luminance data.

6. An image processing device as claimed in claim 5, in which said frequency components are separated using discrete cosine transformation.

7. An image processing device as claimed in claim 5, in which said frequency components contain frequency components specific to halftone dot photographic regions.

8. An image processing device as claimed in claim 7, in which said frequency components further contain frequency components specific to photographic regions.

9. The image processing device of claim 1, further comprising:
   a separator for separating the halftone dot graphic regions from the halftone dot photographic regions in the image data based on the characteristic feature.

10. The image processing device as claimed in claim 1, wherein:
   the image data representing regions that are not comprised of half-tone dots represent pixels in the regions that are not comprised of half-tone dots;
   the luminance data representing dots and spaces therebetween that form halftone dot graphic regions represent pixels that form the dots and spaces; and the luminance data representing dots and spaces therebetween that form halftone dot photographic regions represent pixels that form the dots and spaces.

11. A computer executable program stored on a computer-readable storage medium for causing a computer to execute the steps of:
extracting character regions from image data obtained by scanning an original image;
detecting a characteristic feature formed from luminance data obtained by scanning an original image from which data representing the character regions have been removed;
wherein the luminance data includes one or more of the following three types of data:
data representing regions that are not comprised of non-halftone dot images,
data representing dots and spaces therebetween that form halftone dot graphic regions, and
data representing dots and spaces therebetween that form halftone dot photographic regions,
and distinguishing between the data representing dots and spaces that form halftone dot graphic regions and the data representing dots and spaces therebetween that form halftone dot photographic regions based on the characteristic feature.

12. A computer executable program as claimed in claim 11, in which said step of detecting the characteristic feature has a step of forming a histogram from the luminance data.

13. A computer executable program as claimed in claim 12, in which said step of forming the histogram has a step of calculating a difference between the histogram and a second histogram formed by applying a smoothing process to the histogram.

14. A computer executable program as claimed in claim 12, in which said step of forming the histogram comprises a step of forming the histogram using pixels located on line segments between edges concerning a first direction.

15. A computer executable program as claimed in claim 11 in which said step of detecting the characteristic feature has a step of extracting frequency components from the luminance data.

16. A computer executable program as claimed in claim 15, in which said step of extracting the frequency components has a step of using discrete cosine transformation.

17. A computer executable program as claimed in claim 15, in which said step of extracting the frequency components has a step of extracting the frequency components specific to halftone dot photographic regions.

18. A computer executable program as claimed in claim 17, in which said step of extracting frequency components further has a step of extracting frequency components specific to photographic regions.

19. The program product as claimed in claim 11, further comprising the step of separating the halftone dot graphic regions from the halftone dot photographic regions in the image data based on the characteristic feature.

20. The program as claimed in claim 11, wherein:
the image data representing regions that are not comprised of half-tone dots represent pixels in the regions that are not comprised of half-tone dots;
the luminance data representing dots and spaces therebetween that form halftone dot graphic regions represent pixels that form the dots and spaces; and
the luminance data representing dots and spaces therebetween that form halftone dot photographic regions represent pixels that form the dots and spaces.

21. An image processing method comprising the steps of:
extracting character regions from image data obtained by scanning an original image;
detecting a characteristic feature formed from luminance data obtained by scanning an original image from which data representing the character regions have been removed;
wherein the luminance data includes one or more of the following three types of data:
data representing regions that are not comprised of non-halftone dot images,
data representing dots and spaces therebetween that form halftone dot graphic regions, and
data representing dots and spaces therebetween that form halftone dot photographic regions,
and distinguishing between the data representing dots and spaces that form halftone dot graphic regions and the data representing dots and spaces therebetween that form halftone dot photographic regions based on the characteristic feature.

22. The image processing method of claim 21, further comprising the step of separating the halftone dot graphic regions from the halftone dot photographic regions in the image data based on the characteristic feature.

23. The image processing method as claimed in claim 21, wherein:
the image data representing regions that are not comprised of half-tone dots represent pixels in the regions that are not comprised of half-tone dots;
the luminance data representing dots and spaces therebetween that form halftone dot graphic regions represent pixels that form the dots and spaces; and
the luminance data representing dots and spaces therebetween that form halftone dot photographic regions represent pixels that form the dots and spaces.

24. An image processing device comprising:
a character recognition section for extracting character regions from image data obtained by scanning an original image;
wherein the image data includes one or more of the following types of data;
data representing dots and spaces therebetween that form halftone dot graphic regions; and
data representing dots and spaces therebetween that form halftone dot photographic regions;
a detector for detecting a characteristic feature in luminance data of the image data from which data representing the character regions have been removed by the character recognition section, and which luminance data includes the data representing dots and spaces therebetween that form halftone dot graphic regions and the data representing dots and spaces therebetween that form halftone dot photographic regions; and
a distinguisher for distinguishing the data representing dots and spaces therebetween that form halftone dot graphic regions from the data representing dots and spaces therebetween that form halftone dot photographic regions based on the characteristic feature.

25. An image processing device as claimed in claim 24, in which said characteristic feature is based on a histogram formed from the luminance data.

26. An image processing device as claimed in claim 25, in which said characteristic feature is based on a difference between the histogram and a second histogram formed by applying a smoothing process to the histogram.

27. An image processing device as claimed in claim 25, in which said histogram is formed using pixels located on line segments between edges concerning a first direction based on locations of edges.

28. The image processing device as claimed in claim 24, wherein:
the luminance data representing dots and spaces therebetween that form halftone dot graphic regions represent pixels that form the dots and spaces; and
the luminance data representing dots and spaces therebetween that form halftone dot photographic regions represent pixels that form the dots and spaces.

29. A computer executable program stored on a computer-readable storage medium for causing a computer to execute the steps of:
extracting character regions from image data obtained by scanning an original image;
detecting a characteristic feature formed from luminance data obtained by scanning an original image from which data representing the character regions have been removed;
wherein the luminance data includes one or more of the following types of data:
data representing dots and spaces therebetween that form halftone dot graphic regions, and
data representing dots and spaces therebetween that form halftone dot photographic regions,
and distinguishing between the data representing dots and spaces that form halftone dot graphic regions and the data representing dots and spaces therebetween that form halftone dot photographic regions based on the characteristic feature.

30. A computer executable program as claimed in claim 29, in which said step of detecting the characteristic feature has a step of forming a histogram from the luminance data.

31. A computer executable program as claimed in claim 30, in which said step of forming the histogram has a step of calculating a difference between the histogram and a second histogram formed by applying a smoothing process to the histogram.

32. A computer executable program as claimed in claim 30, in which said step of forming the histogram comprises a step of forming the histogram using pixels located on line segments between edge.

33. The program as claimed in claim 29, wherein:
the luminance data representing dots and spaces therebetween that form halftone dot graphic regions represent pixels that form the dots and spaces; and
the luminance data representing dots and spaces therebetween that form halftone dot photographic regions represent pixels that form the dots and spaces.

34. An image processing method comprising:
extracting character regions from image data obtained by scanning an original image;
detecting a characteristic feature formed from luminance data obtained by scanning an original image from which data representing the character regions have been removed;
wherein the luminance data includes one or more of the following types of data:
data representing dots and spaces therebetween that form halftone dot graphic regions, and
data representing dots and spaces therebetween that form halftone dot photographic regions,
and distinguishing between the data representing dots and spaces that form halftone dot graphic regions and the data representing dots and spaces therebetween that form halftone dot photographic regions based on the characteristic feature.

35. The image processing method as claimed in claim 34, wherein:
the luminance data representing dots and spaces therebetween that form halftone dot graphic regions represent pixels that form the dots and spaces; and
the luminance data representing dots and spaces therebetween that form halftone dot photographic regions represent pixels that form the dots and spaces.

36. An image processing device comprising:
a character recognition section for extracting character regions from image data obtained by scanning an original image;
a detector for detecting a characteristic feature in luminance data of the image data, wherein the image data includes image data representing a first image of dots and spaces therebetween and a second image of dots and spaces therebetween, the first image of dots and spaces therebetween representing a halftone dot graphic image, the second image of dots and spaces therebetween representing a halftone dot photographic image; and
a distinguisher for distinguishing, based on the characteristic feature, between first image data corresponding to the first image and second image data corresponding to the second image.

37. An image processing device as claimed in claim 36, wherein the image data is obtained from scanning the image containing the first image and the second image, and the halftone dot graphic image data and the halftone dot photographic image data essentially consist of image data of bi-tonal values.

* * * * *